(12) United States Patent
Pu

(10) Patent No.: US 12,363,661 B2
(45) Date of Patent: Jul. 15, 2025

(54) METHOD FOR TIME SYNCHRONIZATION, METHOD FOR BROADCAST SETTING, CHIP, ELECTRONIC DEVICE, AND STORAGE MEDIUM

(71) Applicant: Shenzhen Goodix Technology Co., Ltd., Guangdong (CN)

(72) Inventor: Chuan Pu, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 544 days.

(21) Appl. No.: 17/780,955

(22) PCT Filed: Apr. 1, 2020

(86) PCT No.: PCT/CN2020/082823
§ 371 (c)(1),
(2) Date: May 27, 2022

(87) PCT Pub. No.: WO2021/196090
PCT Pub. Date: Oct. 7, 2021

(65) Prior Publication Data
US 2023/0007606 A1    Jan. 5, 2023

(51) Int. Cl.
*H04W 56/00* (2009.01)
*H04W 4/06* (2009.01)
*H04W 4/80* (2018.01)

(52) U.S. Cl.
CPC ......... *H04W 56/0015* (2013.01); *H04W 4/06* (2013.01); *H04W 4/80* (2018.02); *H04W 56/001* (2013.01)

(58) Field of Classification Search
CPC . H04W 56/0015; H04W 4/06; H04W 56/001; H04W 4/80; H04W 56/0025;
(Continued)

(56) References Cited

U.S. PATENT DOCUMENTS

2006/0282675 A1* 12/2006 Yao ................... H04L 9/3242
                                                     713/176
2010/0226342 A1    9/2010 Colling et al.
(Continued)

FOREIGN PATENT DOCUMENTS

CN        101394410 A      3/2009
CN        201348514 Y     11/2009
(Continued)

OTHER PUBLICATIONS

Czechowski et al., "Dedicated Communication Protocols and Network Interfaces in Time Synchronization" IEEE, 2016 (Year: 2016).*
(Continued)

*Primary Examiner* — Omer S Mian
(74) *Attorney, Agent, or Firm* — USCH Law, PC

(57) ABSTRACT

Some embodiments of the present disclosure provide a method for time synchronization, a method for broadcast setting, a chip, an electronic device, and a storage medium. According to the method for time synchronization, time synchronization information is received, the time synchronization information including a first count value N of at least one connection event at a synchronizing end and a first time, the first time being an occurrence time of an $N^{th}$ connection event. A second count value K of the at least one connection event and a second time are determined according to at least the first count value N and the first time, the second time being an occurrence time of a $K^{th}$ connection event, where both N and K are natural numbers. Time synchronization is performed based on the second time in response to occurrence of the $K^{th}$ connection event.

18 Claims, 7 Drawing Sheets

(58) Field of Classification Search
CPC ... H04W 56/002; Y02D 30/70; H04L 7/0016; H04L 7/00
See application file for complete search history.

(56) References Cited

U.S. PATENT DOCUMENTS

| | | | |
|---|---|---|---|
| 2012/0294318 | A1 | 11/2012 | Fang et al. |
| 2015/0092642 | A1 | 4/2015 | Geboff et al. |
| 2016/0135122 | A1 | 5/2016 | Abraham et al. |
| 2017/0208558 | A1 | 7/2017 | Gao et al. |
| 2018/0220384 | A1 | 8/2018 | Keral |
| 2024/0357527 | A1* | 10/2024 | Hollar .................. G01S 5/14 |

FOREIGN PATENT DOCUMENTS

| | | | |
|---|---|---|---|
| CN | 102067492 | A | 5/2011 |
| CN | 102098194 | A | 6/2011 |
| CN | 102664781 | A | 9/2012 |
| CN | 103546268 | A | 1/2014 |
| CN | 105429725 | A | 3/2016 |
| CN | 105610536 | A | 5/2016 |
| CN | 105634639 | A | 6/2016 |
| CN | 106470472 | A | 3/2017 |
| CN | 106559734 | A | 4/2017 |
| CN | 106559735 | A | 4/2017 |
| CN | 107111280 | A | 8/2017 |
| CN | 107204791 | A | 9/2017 |
| CN | 110072278 | A | 7/2019 |
| CN | 110324104 | A | 10/2019 |
| CN | 110492960 | A | 11/2019 |
| EP | 2811672 | A1 | 12/2014 |

OTHER PUBLICATIONS

Navia et al., "GTSO: Global Trace Synchronization and Ordering Mechanism for Wireless Sensor Network Monitoring Platforms" MDPI, 2018 (Year: 2018).*

Calder et al., "Peer-Reviewed Technical Communication", IEEE, 2007 (Year: 2007).*

Afonso Jose Augusto, et al., Performance Evaluation of Bluetooth Low Energy for High Data Rate Body Area Networks, Wireless Personal Communications, Springer, Dordrecht, NL, vol. 90, No. 1, Apr. 23, 2016, 21 pgs.

Shenzhen Goodix Technology Co., Ltd., Extended European Search Report, EP 20928327.4, Oct. 25, 2022, 15 pgs.

Shenzhen Goodix Technology Co., Ltd., CN Decision to Grant with English Translation, CN 202080001647.X, Aug. 11, 2022, 6 pgs.

Shenzhen Goodix Technology Co., Ltd., CN First Office Action with English Translation, CN 202080001647.X, Mar. 31, 2022, 13 pgs.

Shenzhen Goodix Technology Co., Ltd., International Search Report with English translation, PCT/CN2020/082823, Dec. 31, 2020, 8 pgs.

Shanhong Guo et al., Design and Performance Analysis of Clock and Address Based Frequency Hopping Sequence, Telecommunication Engineering, Aug. 28, 2002, 5 pgs.

Samsung, R2-1810773 "Introducing WIs endorsed for ASN.1 review of 36.331 REL-15 second drop", 3 GPP tsg_ran wg2-rl2, Jul. 2, 2018, 895 pgs.

Shenzhen Goodix Technology Co., Ltd., Communication pursuant to Article 94(3) EPC, EP 20928327.4, Jul. 7, 2023, 9 pgs.

* cited by examiner

METHOD FOR TIME SYNCHRONIZATION, METHOD FOR BROADCAST SETTING, CHIP, ELECTRONIC DEVICE, AND STORAGE MEDIUM

CROSS REFERENCE TO RELATED APPLICATIONS

The present application is a United States National Stage Application filed under 35 U.S.C. § 371 of PCT Patent Application Ser. No. PCT/CN2020/082823, filed Apr. 1, 2020, which is incorporated by reference herein in its entirety.

TECHNIC FIELD

Embodiments of the present disclosure relate in general to communication technology, and more specifically to a method for time synchronization, a method for broadcast setting, a chip, an electronic device, and a storage medium.

BACKGROUND

A Bluetooth low energy (BLE) device includes a time synchronization function, i.e., two connected BLE devices are able to synchronize time. When receiving a time synchronization request sent by a synchronized end device, a synchronizing end device may acquire a current time of the synchronizing end device, process the current time into a data packet, and send the data packet to the synchronized end device. After receiving the data packet, the synchronized end device parses the current time of the synchronizing end device from the data packet, and sets a local time as the current time of the synchronizing end device to achieve time synchronization.

The inventors found that there are at least the following problems in the existing technology. In the process of the time synchronization, the synchronizing end device processes the current time of the synchronizing end device into the data packet, transmits the data packet to the synchronized end device, and parses the data packet to obtain the current time of the synchronizing end device. All these operations consume time. During this consumed time, a time of the synchronizing end device is no longer the time in the data packet, but the synchronized end device directly uses the time in the data packet to set the time synchronization, which may cause a time error and inaccurate time synchronization. For example, the current time of the synchronizing end device is '15:30'. The synchronizing end device transmits the data packet including the current time to the synchronized end device, and the synchronized end device parses the data packet to obtain the current time '15:30' and sets the time to '15:30' immediately. At this time, the time of the synchronizing end device has already been '15:32', which causes inaccurate time synchronization.

SUMMARY

Some embodiments of the present disclosure are intended to provide a method for time synchronization, a method for broadcast setting, a chip, an electronic device, and a storage medium, which achieve accurate time synchronization.

Some embodiments of the present disclosure provide a method for time synchronization, including: receiving time synchronization information, wherein the time synchronization information includes a first count value N of at least one connection event at a synchronizing end and a first time, and the first time refers to a time of occurrence of an $N^{th}$ connection event; determining a second count value K of the at least one connection event and a second time according to at least the first count value N and the first time, wherein the second time refers to a time of occurrence of a $K^{th}$ connection event, and both N and K are natural numbers; and performing time synchronization based on the second time in response to occurrence of the $K^{th}$ connection event.

Some embodiments of the present disclosure further provide method for time synchronization, including: determining a first count value N of at least one connection event, wherein N is a natural number; determining a first time according to a current count value Z of at least one connection event locally recorded, a current time, and a preset connection event interval, wherein the first time refers to a time of occurrence of an $N^{th}$ connection event, and Z is a natural number; and sending time synchronization information to a synchronized end to enable the synchronized end to perform time synchronization according to the time synchronization information, wherein the time synchronization information includes the first counter value N and the first time. In this way, the accurate time synchronization of the synchronized end is achieved.

In the embodiments of the present disclosure, the time synchronization information received by the synchronized end from the synchronizing end includes the first count value N of the at least one connection event and the first time. The first time refers to the time of occurrence of the $N^{th}$ connection event. The synchronized end determines a time synchronization execution time based on the count value of the at least one connection event and synchronizes the local time according to the time of occurrence of the connection event at the execution time. Since the connection event is periodically generated after the synchronizing end and the synchronized end are connected, and the count values of connection events at both the synchronizing end and the synchronized end increase synchronously, the count value of the connection events at the synchronized end is the same as the count value of the connection events at the synchronizing end at the time of time synchronization execution, so that the synchronized end is able to achieve the accurate time synchronization with the synchronizing end.

For example, the first count value N is greater than a current count value Z of at least one connection event locally recorded at the synchronizing end when the time synchronization information is issued, and Z is a natural number. Since data transmission and data processing require to occupy the events, it is more reasonable that the value of the first count value N is greater than the current count value Z.

For example, determining the second count value K of the at least one connection event and the second time according to at least the first count value N and the first time includes: in response to a current count value M of at least one connection event locally recorded at the synchronized end being less than the first count value N, determining that a value of the second count value K is N, and the second time is the first time, wherein M is a natural number. If the current count value M is smaller than the first count value N, the first time in the time synchronization information is directly set until the count value is the first count value N in the time synchronization information, and no other calculation process is needed, so that the processing burden is reduced and the time synchronization efficiency is improved.

For example, determining the second count value K of the at least one connection event and the second time according to at least the first count value N and the first time includes: in response to a current count value M of at least one connection event locally recorded at the synchronized end being greater than or equal to the first count value N, determining that a value of the second count value K is greater than or equal to M, and the second time is a sum of the first time and L preset connection event intervals, wherein L=K−N, and both L and M are natural numbers. If the current count value M is greater than or equal to the first count value N, a specific implementation of determining the second count value K and the second time is given.

For example, a value of the second count value K is M+1, and L=M−N+1. Time synchronization is performed when a next connection event of the current connection event occurs, which achieves the time synchronization accurately and as quickly as possible.

For example, after performing the time synchronization based on the second time in response to the occurrence of the $K^{th}$ connection event, the method further includes: feeding back response information to the synchronizing end to enable the synchronizing end to determine whether the time synchronization is successful according to the response information, wherein the response information includes a check count value Q of the at least one connection event and a check time, the check time refers to a time of occurrence of a $Q^{th}$ connection event, and Q is a natural number. In this way, it is determined whether the time synchronization is successful, and the accuracy of the time synchronization is improved.

For example, the check count value Q is greater than the second count value K. A specific implementation is given.

Some embodiments of the present disclosure further provide a method for broadcast setting, wherein each of network nodes completes the time synchronization based on the method for time synchronization described above, and a number of the network nodes is less than or equal to a quotient of a broadcast period that is preset and a maximum duration for sending data at a single time for each of the network nodes; wherein the method includes: configuring the broadcast period for each of the network nodes; and determining a broadcast time point of each of the network nodes in each respective broadcast period according to the broadcast period, the maximum duration for sending data at the single time, and the number of the network nodes. In this way, a probability of generating broadcast interference between network nodes is reduced.

For example, determining the broadcast time point of each of the network nodes in each respective broadcast period according to the broadcast period, the maximum duration for sending data at the single time, and the number of the network nodes includes: determining a total piece number of transmitted data of the network nodes in each respective broadcast period according to the broadcast period and the maximum duration for sending data at the single time; determining a piece number of transmitted data of each of the network nodes in each respective broadcast period according to the total piece number of the transmitted data and the number of the network nodes; determining a total duration in which all the network nodes successively complete transmission of one piece of data according to the broadcast period and the piece number of the transmitted data; and setting a $Y^{th}$ broadcast time point of an $X^{th}$ network node in the broadcast period as Y−1 total durations plus X−1 maximum durations for sending data at the single time, wherein X is less than or equal to the number of the network nodes, Y is less than or equal to the piece number of the transmitted data, and both X and Y are natural numbers. A specific implementation of determining the broadcast time point corresponding to each network node is given.

For example, after sending the time synchronization information to the synchronized end to enable the synchronized end to perform time synchronization according to the time synchronization information, the method further includes: receiving response information fed back by the synchronized end, wherein the response information includes a check count value Q of the at least one connection event and a check time, and Q is a natural number; determining a time of occurrence of a $Q^{th}$ connection event according to at least a current count value H of the at least one connection event locally recorded, wherein H is a natural number and H is greater than Z; and determining that the time synchronization succeeds in response to the time of occurrence of the $Q^{th}$ connection event being the check time. In this way, it is determined whether the time synchronization is successful, and the accuracy of the time synchronization is improved.

For example, determining the time of occurrence of the $Q^{th}$ connection event according to at least the current count value H of the at least one connection event locally recorded includes: in response to the current count value H being less than or equal to the check count value Q, acquiring a local current time as the time of occurrence of the $Q^{th}$ connection event when the $Q^{th}$ connection event occurs. A specific implementation of determining the time of occurrence of the $Q^{th}$ connection event is given.

For example, determining the time of occurrence of the $Q^{th}$ connection event according to at least the current count value H of the at least one connection event locally recorded includes: in response to the current count value H being greater than the check count value Q, acquiring a local current time, and determining the time of occurrence of the $Q^{th}$ connection event as the local current time minus H−Q connection event intervals. A specific implementation of determining the time of occurrence of the $Q^{th}$ connection event is given.

Some embodiments of the present disclosure further provide a chip, connected to at least one memory storing instructions executable by the chip, wherein the instructions, when executed by the chip, cause the chip to perform the methods for time synchronization, or the method for broadcast setting described above.

Some embodiments of the present disclosure further provide an electronic device including the chip described above.

Some embodiments of the present disclosure further provide a computer readable storage medium storing a computer program, wherein the computer program, when executed by at least one processor, cause the at least one processor to perform the methods for time synchronization, or the method for broadcast setting described above.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated. The following embodiments are divided for the convenience of description and shall not constitute any limitation on the specific implementation of the invention. Various embodiments are able to be combined and referenced with each other without contradiction.

DETAILED DESCRIPTION OF THE EMBODIMENTS

In order to make the purposes, technical solutions and advantages of the present disclosure clearer, the following describes some embodiments of the present disclosure in detail with reference to the accompanying drawings. It should be noted that the specific embodiments described herein are intended only to explain and not to limit the present disclosure.

Figure 1:
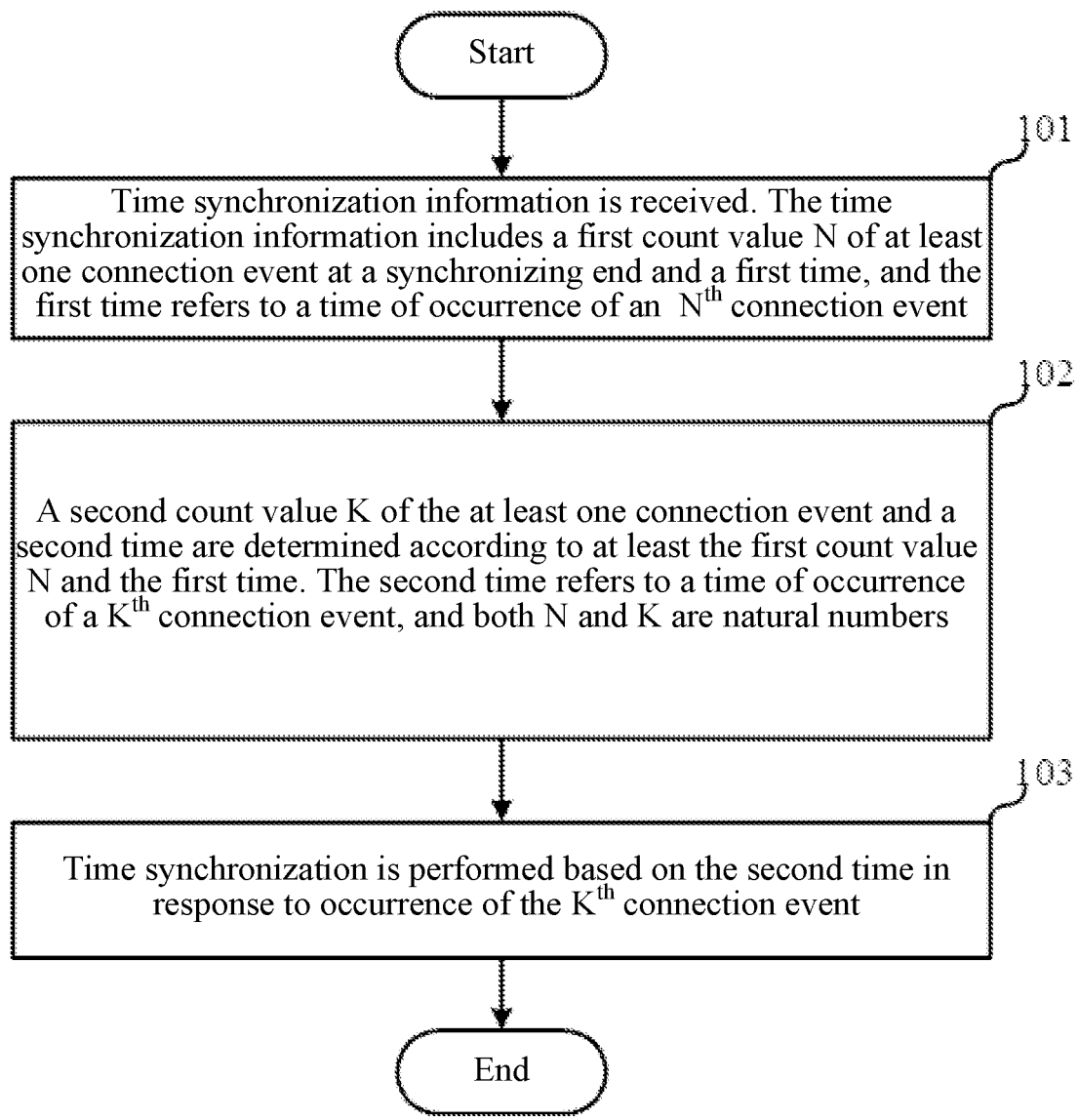
FIG. 1 is a flowchart of a method for time synchronization according to a first embodiment of the present disclosure.

A first embodiment of the present disclosure relates to a method for time synchronization applied at a Bluetooth device. A receiving end of time synchronization information is a synchronized end, and a transmitting end of the time synchronization information is a synchronizing end. After the synchronizing end and the synchronized end are connected by Bluetooth, frequency hopping occurs continuously. Each time frequency hopping occurs, count values of connection event counters at both ends increase by one synchronously. The count values of the counters start counting from establishment of Bluetooth connection between both ends, and in one Bluetooth connection, the count values at both ends are consistent with each other when each connection event occurs. Moreover, there is a time interval between two connection events, which is called a connection event interval, and the connection event interval of both ends are also the same. A specific flowchart of the method for time synchronization in this embodiment is shown in FIG. 1, which includes the following operations.

In 101, time synchronization information is received. The time synchronization information includes a first count value N of at least one connection event at a synchronizing end and a first time, and the first time refers to a time of occurrence of an $N^{th}$ connection event.

Specifically, the synchronized end sends a time synchronization request to the synchronizing end, and the synchronizing end determines the first count value N of the at least one connection event after receiving the time synchronization request. The first count value N may be any value, which is not specifically limited in this embodiment. The synchronizing end transmits the time synchronization information including the first count value N of the at least one connection event at the synchronizing end and the first time to the synchronized end, and the synchronized end parses the time synchronization information to obtain the first count value N of the at least one connection event and the first time in the time synchronization information after receiving the time synchronization information issued by the synchronizing end. The first time refers to the time of occurrence of the $N^{th}$ connection event.

In one example, the first count value N is greater than a current count value Z of at least one connection event locally recorded at the synchronizing end when the time synchronization information is issued, where Z is a natural number. For example, if the current count value Z of the at least one connection event locally recorded at the synchronizing end when the time synchronization information is issued is 10, the first count value N may be 12, 14, etc.

In one example, information is transmitted between the synchronizing end and the synchronized end in the form of a data packet, and fields in the data packet may be configured to record the time synchronization information, i.e., the synchronized end receives a data packet including the time synchronization information. The synchronized end parses the data packet to obtain the first count value N of the at least one connection event and the first time in the time synchronization information. This data packet adds a first field to an original data packet, for example, the first field may be 2 bytes. The first field is configured to store the first count value N of the at least one connection event, and a second field of the original data packet is configured to store the first time. It should be noted that a length of the first field matches a length of time in milliseconds, i.e., the length of the first field is able to record the time in milliseconds.

In another example, a third field may be added to the original data packet, for example, the third field may be 2 bytes, denoted as Tus, for recording time in microseconds, i.e., the first time is recorded in the second field and the third field. The second field is configured to record a value of the first time in milliseconds, and the third field is configured to record a value of the first time in microseconds. In this way, a length of the field configured to record the time is increased, so that the accuracy of the first time is able to reach the microsecond level, thereby improving the accuracy of the time synchronization.

In 102, a second count value K of the at least one connection event and a second time are determined according to at least the first count value N and the first time. The second time refers to a time of occurrence of a $K^{th}$ connection event, and both N and K are natural numbers.

In 103, time synchronization is performed based on the second time in response to occurrence of the $K^{th}$ connection event.

Specifically, a current count value M of at least one connection event locally recorded at the synchronized end is the current count value of the counter. In this embodiment, in response to the current count value M being less than the first count value N, a value of the second count value K is determined as N, and the second time is determined as the first time. In this case, a count value of the at least one connection event at the synchronizing end is N, and the current time is also the first time, thereby achieving the accurate time synchronization. That is, if the current count value is less than the first count value, it indicates that a count value of at least one connection event at this time has not reached the first count value N, and then, the time synchronization is performed based on the first time when the $N^{th}$ connection event occurs, without performing another calculation process, thereby reducing the processing burden and improving the efficiency of the time synchronization. For example, a current count value Z of connection events locally recorded at the synchronizing end is 8, and the first count value is determined as 12. If the current count value M of connection events locally recorded at the synchronized end is 10, the time is set to the first time in response to occurrence of the twelfth connection event. In this case, the count value of the connection events at the synchronizing end is also 12, and the time is the first time, so that the time of the synchronized end is consistent with the time of the synchronizing end, thereby achieving the accurate time synchronization.

In another example, if the current count value M is less than the first count value N, the value of the second count value K may be greater than or equal to the current count value M and less than the first count value N, and the second time is a difference between the first time and L preset connection event intervals, where L=N−K, i.e., the second time at the occurrence of the $K^{th}$ connection event=the first time−(N−K)*the preset connection event interval. For example, if the current count value M of the connection events locally recorded at the synchronized end is 10, the first count value is 12, and a value of the second count value K may be 11, the time is set to the second time in response to occurrence of the eleventh connection event. In this case, the count value of the connection events at the synchronizing end is also 11, and the time is the second time. The time of the synchronized end is consistent with the time of the synchronizing end, thereby achieving the accurate time synchronization.

In one example, if the current count value M is greater than or equal to the first count value N, the value of the second count value K is determined to be greater than or equal to M, and the second time is a sum of the first time and the L preset connection event intervals, where L=K−N, i.e., the second time at the occurrence of the $K^{th}$ connection event=(K−N)*the preset connection event interval+the first time. In this case, the count value of the at least one connection event at the synchronizing end is also K, and the current time is also the second time, thereby achieving the accurate time synchronization. In one example, the value of the second count value K is M+1, and L=M−N+1, the time synchronization is performed when a next connection event of the current connection event occurs, so that the time synchronization is achieved accurately and as quickly as possible. For example, if the current count value M of the connection events locally recorded is 14 and the first count value N is 12, K is 15 and L is 3, i.e., the time is set to the second time in response to occurrence of the fifteenth connection event. Furthermore, as described in the above example, the value of the second count value K may be 14, and the time is set to the second time in response to occurrence of the fourteenth connection event.

In this embodiment, since the connection event is periodically generated after the synchronizing end and the synchronized end are connected, and the count values of the connection events at both the synchronizing end and the synchronized end increase synchronously, the count value of the connection events at the synchronized end is the same as the count value of the connection events at the synchronizing end at the time of time synchronization execution, so that the synchronized end is able to achieve the accurate time synchronization with the synchronizing end.

Figure 2:
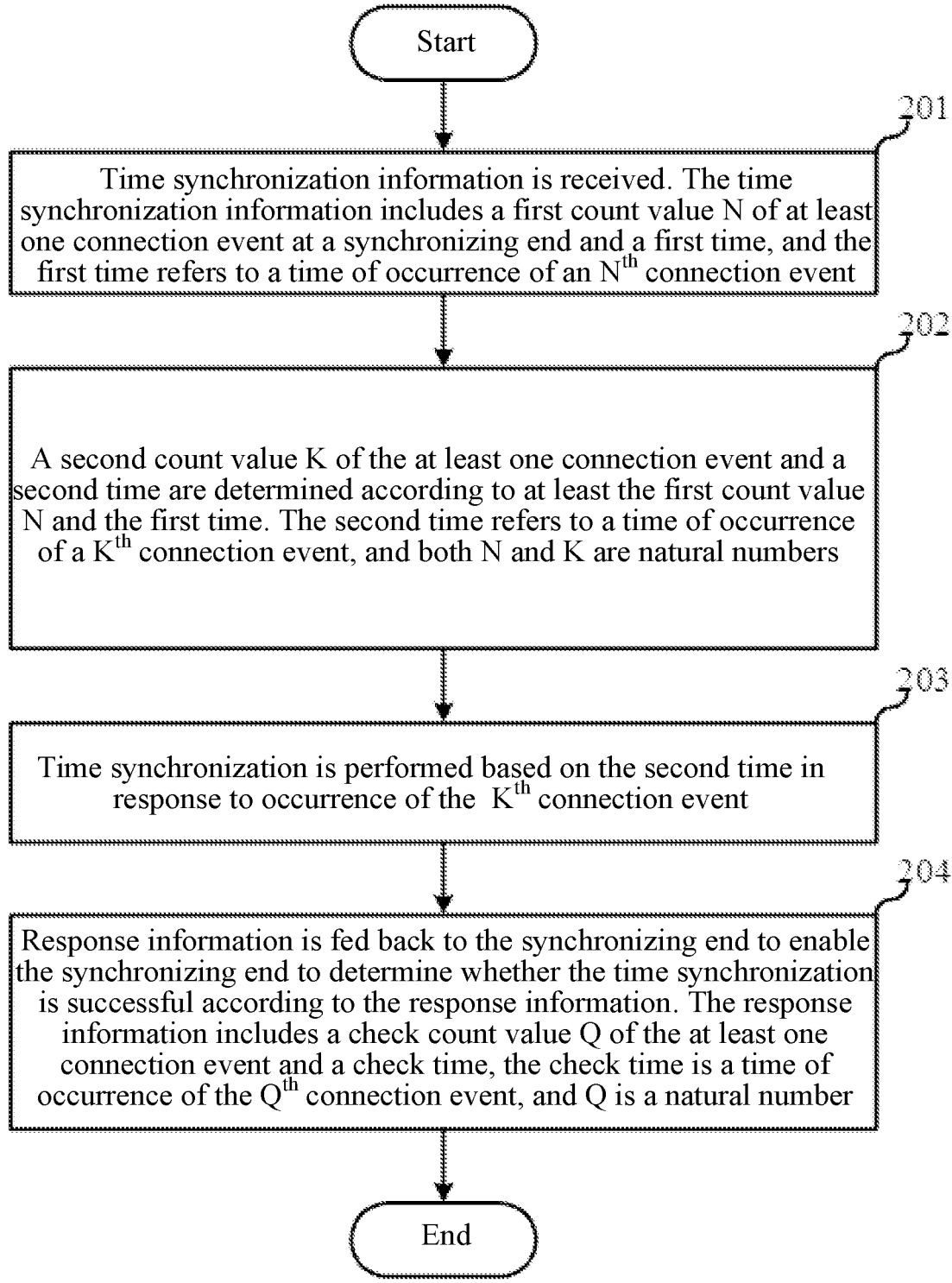
FIG. 2 is a flowchart of a method for time synchronization according to a second embodiment of the present disclosure.

A second embodiment of the present disclosure relates to a method for time synchronization. The second embodiment is substantially the same as the first embodiment, and is different from the first embodiment in that response information is fed back to the transmitting end of the time synchronization information to enable the transmitting end to determine whether the time synchronization is successful according to the response information. A specific flowchart of the method for time synchronization in this embodiment is shown in FIG. 2, which includes the following operations.

In 201, time synchronization information is received. The time synchronization information includes a first count value N of at least one connection event at a synchronizing end and a first time, and the first time refers to a time of occurrence of an $N^{th}$ connection event.

In 202, a second count value K of the at least one connection event and a second time are determined according to at least the first count value N and the first time. The second time refers to a time of occurrence of a $K^{th}$ connection event, and both N and K are natural numbers.

In 203, time synchronization is performed based on the second time in response to occurrence of the $K^{th}$ connection event.

The operations 201 to 203 are similar to operations 101 to 103, thus details are not repeated herein.

In 204, response information is fed back to the synchronizing end to enable the synchronizing end to determine whether the time synchronization is successful according to the response information. The response information includes a check count value Q of the at least one connection event and a check time, the check time is a time of occurrence of the $Q^{th}$ connection event, and Q is a natural number.

Specifically, the check count value Q of the at least one connection event may be taken according to actual needs, which is not specifically limited in this embodiment. The check time is the time of occurrence of the $Q^{th}$ connection event. Since it takes time to transmit the response information and process the response information, the count value of the at least one connection event is greater than the second count value K when the synchronizing end performs the check. Therefore, the check count value Q may be set to be greater than the second count value K, i.e., the check count value Q is obtained by adding a count value of at least one predicted connection event to the second count value K, i.e., the check count value Q=the second count value K+the count value of at least one predicted connection event. The count value of at least one predicted connection event is a count value of at least one connection event that possibly occurs when data transmission and data processing occupy the time. At this time, the check time=the second time+(Q−K)*the preset connection event interval. In one example, the check count value Q may also be less than or equal to the second count value K, thus the check time=the second time−(K−Q)*the preset connection event interval.

In one example, a format of the data packet including the response information is consistent with that of the data packet including the time synchronization information. This data packet adds a first field to an original data packet, for example, the newly added field may be 2 bytes. The first field is configured to store the check count value Q of the at least one connection event, and a second field of the original data packet is configured to store the check time. It should be noted that a length of the first field matches a length of time in milliseconds, i.e., the length of the first field is able to record the time in milliseconds.

In another example, a third field may be added to the original data packet, for example, the third field may be 2 bytes, denoted as Tus, for recording time in microseconds, i.e., the check time is recorded in the second field and the third field. The second field is configured to record a value of the check time in milliseconds, and the third field is configured to record a value of the check time in microseconds. In this way, a length of the field configured to record the time is increased, so that the accuracy of the check time is able to reach the microsecond level, thereby improving the accuracy of the time synchronization.

In this embodiment, the response information is fed back to the transmitting end of the time synchronization information, so that the transmitting end determines whether the time synchronization is successful according to the response information, thereby improving the accuracy of the time synchronization.

Figure 3:
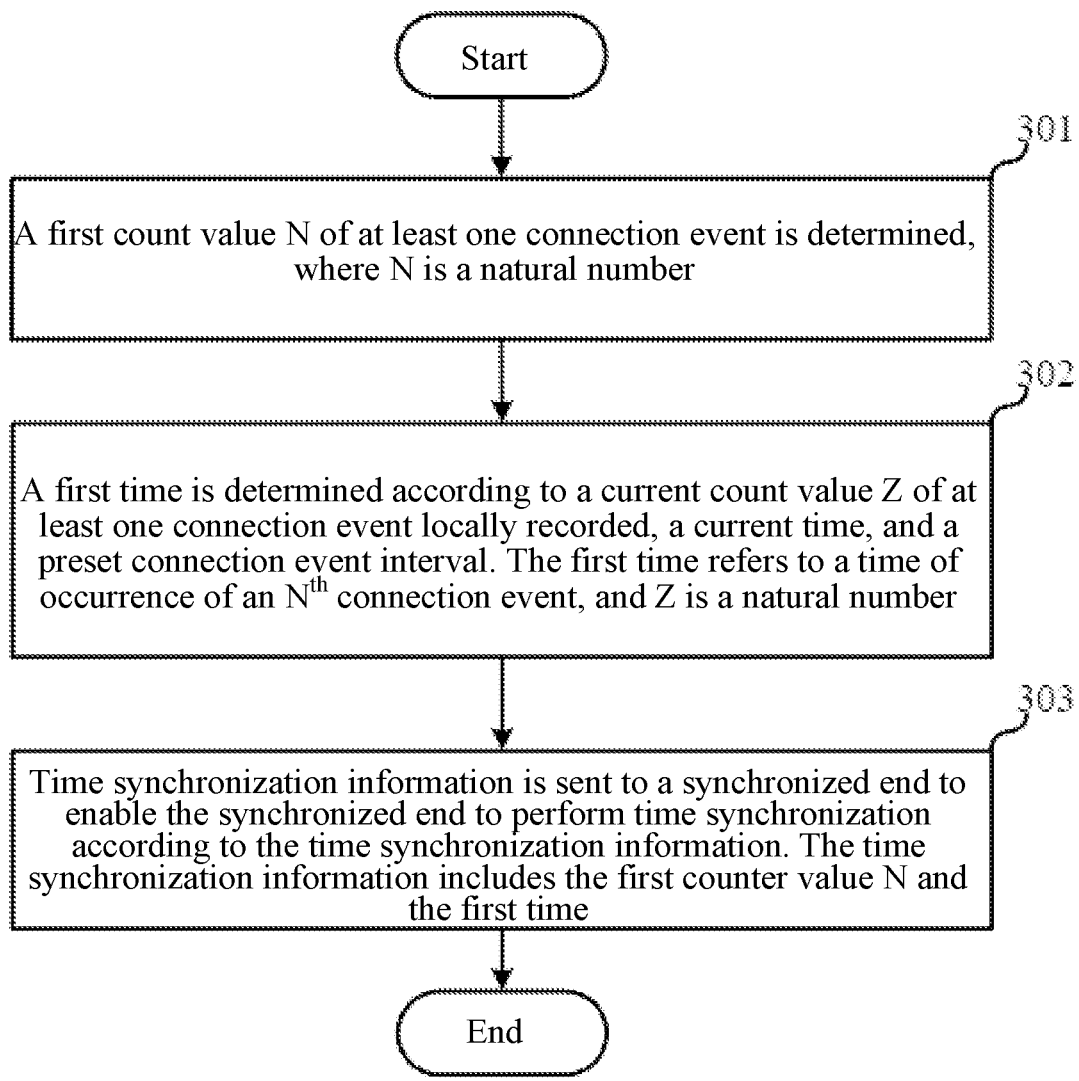
FIG. 3 is a flowchart of a method for time synchronization according to a third embodiment of the present disclosure.

A third embodiment of the present disclosure relates to a method for time synchronization applied at a Bluetooth device. A specific flowchart of the method for time synchronization in this embodiment is shown in FIG. 3, which includes the following operations.

In 301, a first count value N of at least one connection event is determined, where N is a natural number.

In 302, a first time is determined according to a current count value Z of at least one connection event locally recorded, a current time, and a preset connection event interval. The first time refers to a time of occurrence of an $N^{th}$ connection event, and Z is a natural number.

In 303, time synchronization information is sent to a synchronized end to enable the synchronized end to perform time synchronization according to the time synchronization information. The time synchronization information includes the first counter value N and the first time.

Specifically, the synchronizing end determines the first count value N of the at least one connection event and the first time after receiving the time synchronization request from the synchronized end. In one example, the first count value N is greater than the current count value Z of the at least one connection event locally recorded, and the first count value N is determined by the synchronizing end according to the current count value Z of the at least one connection event locally recorded. Since the data transmission and data processing occupy the time, the count value of the at least one connection event should be greater than the current count value Z when the synchronized end sets the time. Therefore, the first count value N may be set to be greater than the current count value Z, i.e., the first count value is obtained by adding a count value of predicted connection events to the current count value Z, i.e., the first count value N=the current count value Z of the at least one connection event locally recorded+the count value of predicted connection events. The count value of predicted connection events is a count value of connection events that may occur when data transmission and data processing occupy the time. For example, the current count value Z of connection events locally recorded is 8. If the count value of the predicted connection events is 4, the first count value N is 12. In this case, the first time is calculated by the synchronizing end according to the current count value Z of the at least one connection event locally recorded, the current time and a preset connection event interval, i.e., the first time=the current time+(N−Z)*the preset connection event interval. In another example, the first count value N is less than the current count value Z of the at least one connection event locally recorded, in which case the first time=the current time−(Z−N)*the preset connection event interval. In another example, the first count value N is equal to the current count value Z of the at least one connection event locally recorded, in which the first time is equal to the current time.

In an example, information is transmitted between the synchronizing end and the synchronized end in the form of a data packet, and fields in the data packet may be configured to record the time synchronization information, i.e., a data packet including the time synchronization information is sent to the synchronized end for the synchronized end to perform the time synchronization according to the time synchronization information. The time synchronization information includes the first count value N and the first time.

In this embodiment, Since the connection event is periodically generated after the synchronizing end and the synchronized end are connected, and the count values of connection events at both the synchronizing end and the synchronized end increase synchronously, the count value of the connection events at the synchronized end is the same as the count value of the connection events at the synchronizing end at the time of time synchronization execution, so that the synchronized end is able to achieve the accurate time synchronization with the synchronizing end.

Figure 4:
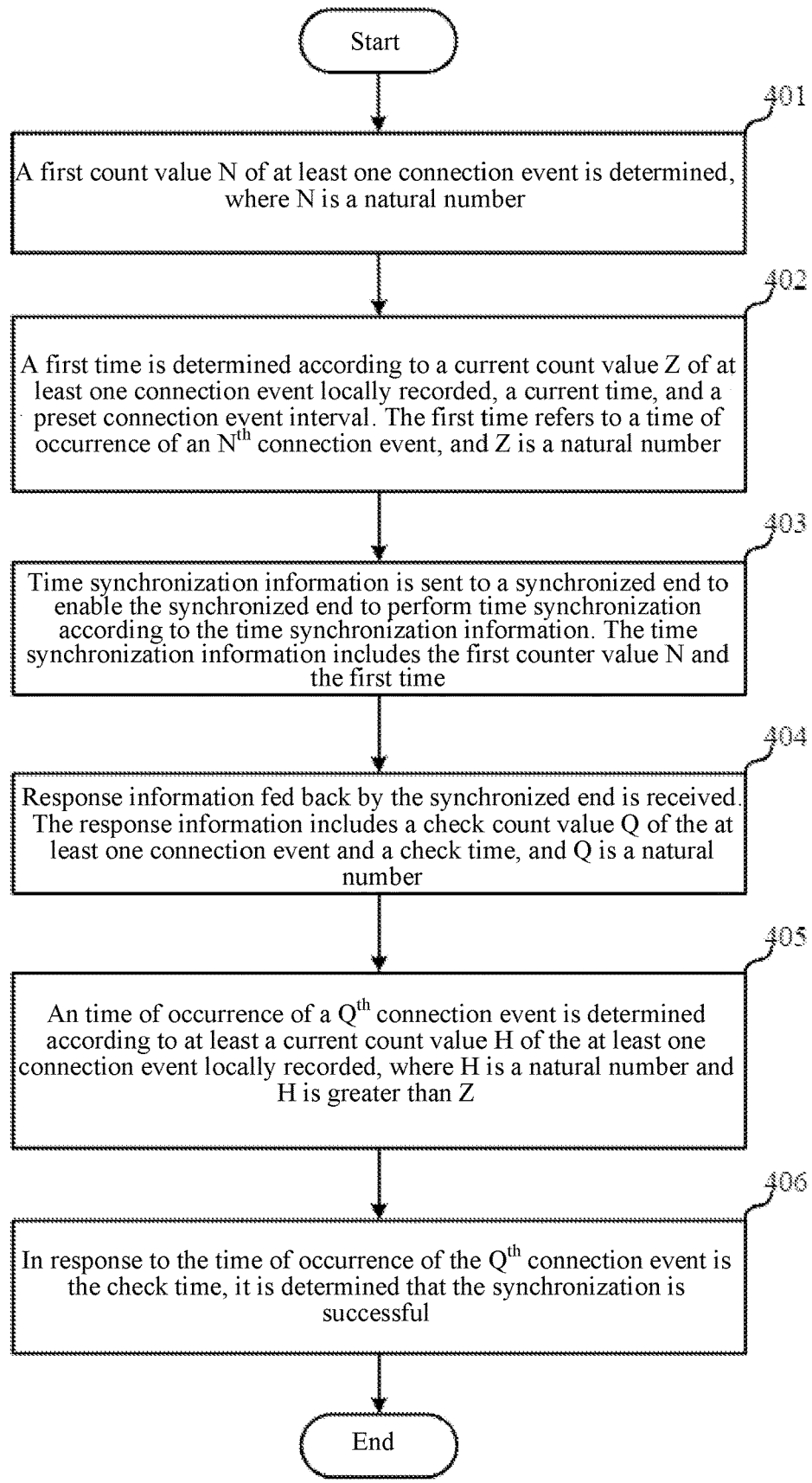
FIG. 4 is a flowchart of a method for time synchronization according to a fourth embodiment of the present disclosure.

A fourth embodiment of the present disclosure relates to a method for time synchronization. The fourth embodiment is substantially the same as the third embodiment, and is different from the third embodiment in that whether synchronization is successful is determined according to received response information fed back by the synchronized end. A specific flowchart of the method for time synchronization in this embodiment is shown in FIG. 4, which includes the following operations.

In 401, a first count value N of at least one connection event is determined, where N is a natural number.

In 402, a first time is determined according to a current count value Z of at least one connection event locally recorded, a current time, and a preset connection event interval. The first time refers to a time of occurrence of an $N^{th}$ connection event, Z is a natural number, and Z is less than N.

In 403, time synchronization information is sent to a synchronized end to enable the synchronized end to perform time synchronization according to the time synchronization information. The time synchronization information includes the first counter value N and the first time.

The operations 401 to 403 are similar to operations 301 to 303, thus details are not repeated herein.

In 404, response information fed back by the synchronized end is received. The response information includes a check count value Q of the at least one connection event and a check time, and Q is a natural number.

Specifically, the synchronizing end parses the received response information to obtain the check count value Q of the at least one connection event and the check time. The check time refers to a time of occurrence of a $Q^{th}$ connection event. In one example, if the check count value Q is greater than the second count value K, the check time=the second time+(Q−K)*a preset connection event interval. In another example, if the check count value Q is less than or equal to the second count value K, the check time=the second time−(K−Q)*the preset connection event interval.

In 405, a time of occurrence of a $Q^{th}$ connection event is determined according to at least a current count value H of the at least one connection event locally recorded, where H is a natural number and H is greater than Z.

In 406, in response to the time of occurrence of the $Q^{th}$ connection event being the check time, it is determined that the synchronization is successful.

Specifically, the current count value H of the at least one connection event locally recorded refers to a count value of at least one connection event at the time the response information fed back by the synchronized end is received. In one example, if the current count value H of the at least one connection event is less than or equal to the check count value Q, a local current time is acquired as the time of occurrence of the $Q^{th}$ connection event in response to occurrence of the $Q^{th}$ connection event. In one example, if the current count value H of the at least one connection event is greater than the check count value Q, the local current time is acquired, and it is determined that the time of occurrence of the $Q^{th}$ connection event is the local current time minus (H−Q) connection event intervals. In this case, the local current time is a time when the count value of the connection event is H, i.e., and the time of occurrence of the $Q^{th}$ connection event=the local current time−(H−Q) connection event intervals. If the time of occurrence of the $Q^{th}$ connection event is the check time, it is determined that the synchronization is successful. If the time of occurrence of the $Q^{th}$ connection event is not the check time, it is determined that the synchronization is unsuccessful, and the time synchronization is performed again.

In this embodiment, it is determined whether the time synchronization is successful according to the time of occurrence of the $Q^{th}$ connection event and the check time, thereby improving the accuracy of the time synchronization.

Figure 5:
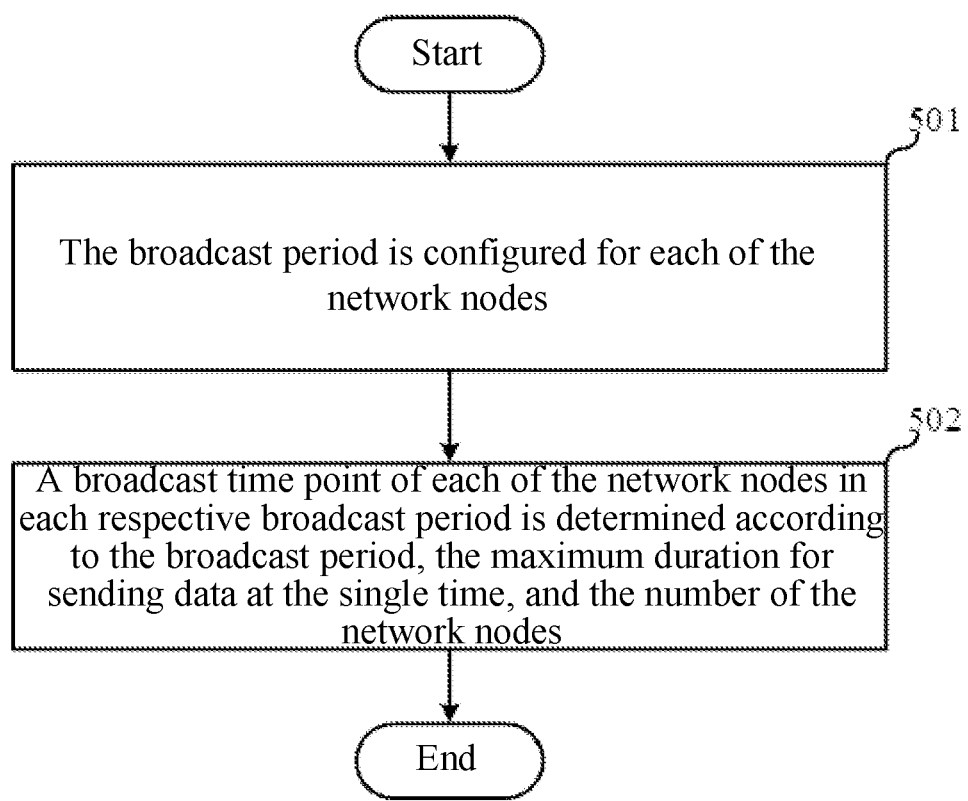
FIG. 5 is a flowchart of a method for broadcast setting according to a fifth embodiment of the present disclosure.

A fifth embodiment of the present disclosure relates to a method for broadcast setting applied at a network node. Networks connected to each other include a plurality of network nodes, the network is a mesh network, each of the network nodes completes time synchronization based on the method for time synchronization described above, and a number of the network nodes is less than or equal to a quotient of a broadcast period that is preset and a maximum duration for sending data at a single time for each of the network nodes. As shown in FIG. 5, a specific flowchart of the method for broadcast setting in this embodiment includes the following operations.

In 501, the broadcast period is configured for each of the network nodes.

Specifically, each network node joins the mesh network and completes the networking, and each network node completes the time synchronization based on the method for time synchronization described above. The broadcast period is preset according to actual needs, and the number of the network nodes is less than or equal to a quotient of the preset broadcast period and a maximum duration for sending data at a single time for each network node. For example, if the broadcast period is 20 ms and the maximum duration for sending data at a single time for the network node is 1 ms, a maximum of 20 network nodes is able to be selected.

In 502, a broadcast time point of each of the network nodes in each respective broadcast period is determined according to the broadcast period, the maximum duration for sending data at the single time, and the number of the network nodes.

It should be noted that, after the broadcast time point of each network node in each respective broadcast period is determined, the broadcast time point corresponding to each network node is distributed to the corresponding network node. In one broadcast period, each network node transmits data at each corresponding broadcast time point, so that each network node transmits the data at different times.

Figure 6:
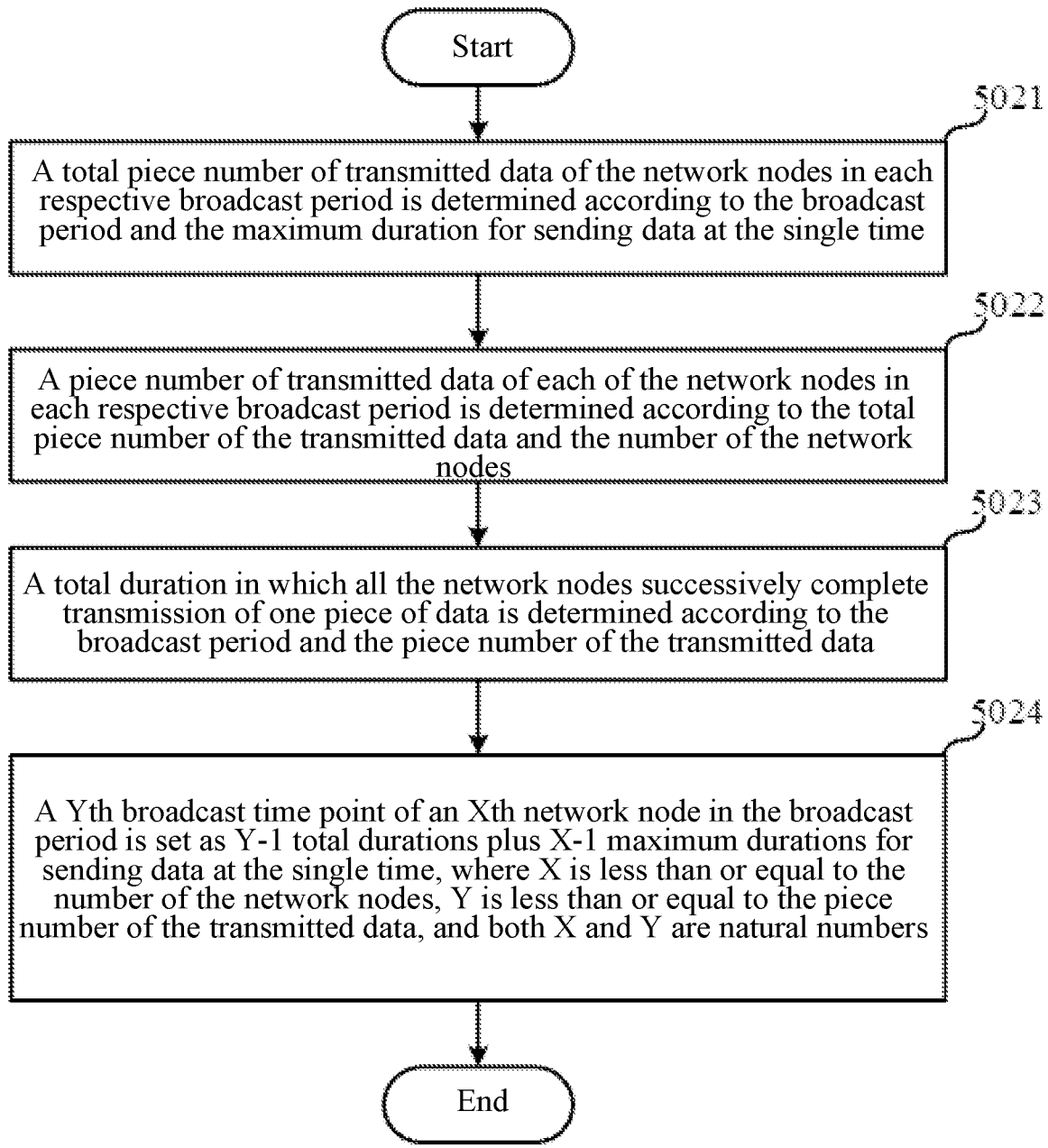
FIG. 6 is a flowchart of a specific implementation of operation 502 according to the fifth embodiment of the present disclosure.

In one example, a specific flowchart for determining the broadcast time point of each of the network nodes in each respective broadcast period according to the broadcast period, the maximum duration for sending data at the single time, and the number of the network nodes is shown in FIG. 6, which includes the following operations.

In 5021, a total piece number of transmitted data of the network nodes in each respective broadcast period is determined according to the broadcast period and the maximum duration for sending data at the single time.

In 5022, a piece number of transmitted data of each of the network nodes in each respective broadcast period is determined according to the total piece number of the transmitted data and the number of the network nodes.

In 5023, a total duration in which all the network nodes successively complete transmission of one piece of data is determined according to the broadcast period and the piece number of the transmitted data.

Specifically, the total piece number of transmitted data of all the network nodes in the broadcast period=the broadcast period/the maximum duration for sending data at a single time, the piece number of transmitted data of each network node in the broadcast period=the total piece number of transmitted data/the number of the network nodes, and the total duration in which all the network nodes successively complete transmission of one piece of data=the broadcast period/the piece number of transmitted data.

In 5024, a $Y^{th}$ broadcast time point of an $X^{th}$ network node in the broadcast period is set as Y−1 total durations plus X−1 maximum durations for sending data at the single time, where X is less than or equal to the number of the network nodes, Y is less than or equal to the piece number of the transmitted data, and both X and Y are natural numbers.

Specifically, the $Y^{th}$ broadcast time point of the $X^{th}$ network node in the broadcast period=(Y−1) total durations+(X−1) maximum durations for sending data at the single time, X is less than or equal to the number of the network nodes, Y is less than or equal to the number of the piece number of transmitted data, and both X and Y are natural numbers.

In one example, if the broadcast period is 20 ms and the maximum duration for sending data at the single time is 1 ms, a maximum of 20 network nodes is able to be selected. If the number of the network nodes is 20, the total piece number of the transmitted data of all the network nodes in the broadcast period is 20, the piece number of the transmitted data of each network node in the broadcast period is 1, and the total duration in which all the network nodes successively complete transmission of one piece of data is 20 ms, then a node 1 transmits data at 0 ms of the broadcast period, a node 1 transmits data at $1^{st}$ ms of the broadcast period, . . . , and a node 20 transmits data at $20^{th}$ ms of the broadcast period. It should be noted that if the node 2 receives the data at $8^{th}$ ms, the node 2 waits until the $1^{st}$ ms of a next broadcast period to transmit the data.

Figure 7:
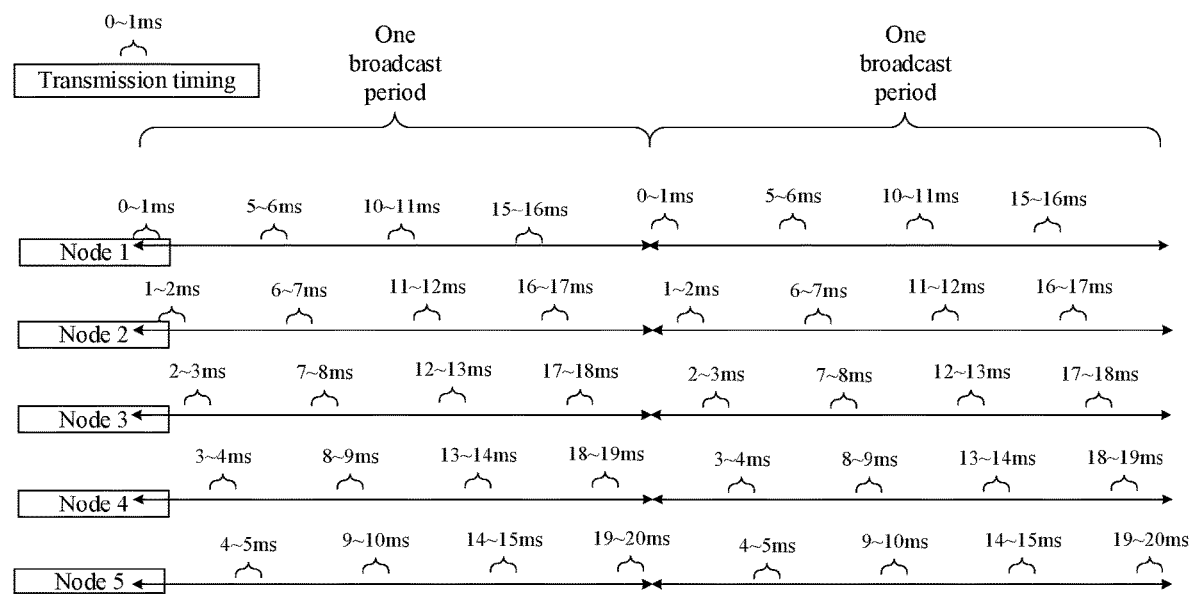
FIG. 7 is a schematic diagram of a broadcast time point corresponding to a network node according to the fifth embodiment of the present disclosure.

In another example, if the broadcast period is 20 ms and the maximum duration for sending data at the single time is 1 ms. If the number of the network nodes is 5, the total piece number of transmitted data of all the network nodes in the broadcast period is 20, the piece number of transmitted data of each network node in the broadcast period is 4, and the total duration in which all the network nodes successively complete transmission of one piece of data is 5 ms. FIG. 7 shows a schematic diagram of broadcast time points corresponding to 5 network nodes, then the node 1 transmits data at 0 ms, $5^{th}$ ms, $10^{th}$ ms, $15^{th}$ ms of the broadcast period, . . . , the node 5 transmits data at $4^{th}$ ms, $9^{th}$ ms, $14^{th}$ ms, $19^{th}$ ms of the broadcast period. It should be noted that if a network node has two or more broadcast time points in a broadcast period, the latest broadcast time point is selected to transmit data. As described in the above example, if the network node 2 receives the data at the $8^{th}$ ms, the network node 2 transmits the data at the $11^{th}$ ms of the broadcast period.

In the existing technology, in order to avoid broadcast interference due to a plurality of network node receiving data at the same time and sending the data immediately, each network node may delay a random duration to send the data after receiving the data, but the random duration is uncontrollable. If the random duration is too long, the data transmission rate is affected, and if the random duration is too short, the probability of causing broadcast interference is increased. In the embodiments of the present disclosure, the network node transmits the data only when the corresponding broadcast time point is reached after receiving the data to be transmitted. In this way, the data transmission rate is ensured and the broadcast interference is not generated between the network nodes to affect each other.

A sixth embodiment of the present disclosure relates to a chip connected to at least one memory storing instructions executable by the chip. The instructions, when executed by the chip, cause the chip to perform the methods for time synchronization, or the method for broadcast setting described above.

A seventh embodiment of the present disclosure relates to an electronic device including the above chip.

An eighth embodiment of the present disclosure relates to a computer readable storage medium storing a computer program. The computer program, when executed by at least one processor, cause the at least one processor to perform the methods for time synchronization, or the method for broadcast setting described above.

Those of ordinary skill in the art should appreciate that the embodiments described above are specific embodiments of the present disclosure, and that various changes may be made thereto in form and detail in practical application without departing from the spirit and scope of the present disclosure.

What is claimed is:

1. A method for time synchronization, applied at a synchronized end, comprising:
   receiving time synchronization information, wherein the time synchronization information includes a first count value N of at least one connection event at a synchronizing end and a first time, and the first time refers to an occurrence time of an Nth connection event;
   determining a second count value K of the at least one connection event and a second time according to at least the first count value N and the first time, wherein the second time refers to an occurrence time of a Kth connection event, and both N and K are natural numbers;
   performing time synchronization based on the second time in response to occurrence of the Kth connection event; and
   feeding back response information to the synchronizing end to enable the synchronizing end to determine whether the time synchronization is successful according to the response information, wherein the response information includes a check count value Q of the at least one connection event and a check time, the check time refers to an occurrence time of a Qth connection event determined at the synchronized end, and Q is a natural number, and wherein the time synchronization is successful when the check time coincides with an occurrence time of the Qth connection event determined at the synchronizing end, and Q is a natural number.

2. The method according to claim 1, wherein the first count value N is greater than a current count value Z of at least one connection event locally recorded at the synchronizing end when the time synchronization information is issued, and wherein Z is a natural number.

3. The method according to claim 1, wherein determining the second count value K of the at least one connection event and the second time according to at least the first count value N and the first time comprises:

in response to a current count value M of the at least one connection event locally recorded at the synchronizing end being less than the first count value N, determining that a value of the second count value K is N, and the second time is the first time, wherein M is a natural number.

4. The method according to claim 1, wherein determining the second count value K of the at least one connection event and the second time according to at least the first count value N and the first time comprises:
   in response to a current count value M of the at least one connection event locally recorded at the synchronizing end being greater than or equal to the first count value N, determining that a value of the second count value K is greater than or equal to M, and the second time is a sum of the first time and L preset connection event intervals, wherein L=K−N, and both L and M are natural numbers.

5. The method according to claim 4, wherein a value of the second count value K is M+1, and L=M−N+1.

6. The method according to claim 1, wherein the check count value Q is greater than the second count value K.

7. A method for broadcast setting, applied at network nodes, wherein each of the network nodes serves as a synchronized end and completes time synchronization based on a method for time synchronization, and a number of the network nodes is less than or equal to a quotient of a broadcast period that is preset and a maximum duration for sending data at a single time at each of the network nodes; wherein:
   the method for time synchronization comprises:
   receiving time synchronization information, wherein the time synchronization information includes a first count value N of at least one connection event at a synchronizing end and a first time, and the first time refers to an occurrence time of an Nth connection event;
   determining a second count value K of the at least one connection event and a second time according to at least the first count value N and the first time, wherein the second time refers to an occurrence time of a Kth connection event, and both N and K are natural numbers;
   performing time synchronization based on the second time in response to occurrence of the Kth connection event; and
   feeding back response information to the synchronizing end to enable the synchronizing end to determine whether the time synchronization is successful according to the response information, wherein the response information includes a check count value Q of the at least one connection event and a check time, the check time refers to an occurrence time of a Qth connection event determined at the synchronized end, and Q is a natural number, and wherein the time synchronization is successful when the check time coincides with an occurrence time of the Qth connection event determined at the synchronizing end, and Q is a natural number;
   the method for broadcast setting comprises:
   configuring the broadcast period for each of the network nodes; and determining a broadcast time point of each of the network nodes in the broadcast period according to the broadcast period, the maximum duration for sending data at the single time, and the number of the network nodes.

8. The method according to claim 7, wherein determining the broadcast time point of each of the network nodes in the broadcast period according to the broadcast period, the maximum duration for sending data at the single time, and the number of the network nodes comprises:
    determining a total piece number of transmitted data of all the network nodes in the broadcast period according to the broadcast period and the maximum duration for sending data at the single time;
    determining a piece number of transmitted data of each of the network nodes in the broadcast period according to the total piece number of the transmitted data and the number of the network nodes;
    determining a total duration in which all the network nodes successively complete transmission of one piece of data according to the broadcast period and the piece number of the transmitted data; and
    setting a $Y^{th}$ broadcast time point of an $X^{th}$ network node in the broadcast period as Y−1 total durations plus X−1 maximum durations for sending data at the single time, wherein X is less than or equal to the number of the network nodes, Y is less than or equal to the piece number of the transmitted data, and both X and Y are natural numbers.

9. A method for time synchronization, applied at a synchronizing end, comprising:
    determining a first count value N of at least one connection event, wherein N is a natural number;
    determining a first time according to a current count value Z of at least one connection event locally recorded, a current time, and a preset connection event interval, wherein the first time refers to an occurrence time of an $N^{th}$ connection event, and Z is a natural number;
    sending time synchronization information to a synchronized end to enable the synchronized end to perform time synchronization according to the time synchronization information, wherein the time synchronization information includes the first counter value N and the first time;
    receiving response information fed back by the synchronized end, wherein the response information includes a check count value Q of the at least one connection event and a check time, and Q is a natural number;
    determining an occurrence time of a $Q^{th}$ connection event according to at least a current count value H of the at least one connection event locally recorded, wherein H is a natural number and H is greater than Z;
    determining that the time synchronization succeeds in response to the occurrence time of the $Q^{th}$ connection event being the check time; and
    determining that the time synchronization is unsuccessful and performing the time synchronization again in response to the occurrence time of the $Q^{th}$ connection event being not the check time.

10. The method according to claim 9, wherein determining the occurrence time of the $Q^{th}$ connection event according to at least the current count value H of the at least one connection event locally recorded comprises:
    in response to the current count value H being less than or equal to the check count value Q, acquiring a local current time as the occurrence time of the $Q^{th}$ connection event when the $Q^{th}$ connection event occurs.

11. The method according to claim 9, wherein determining the occurrence time of the $Q^{th}$ connection event according to at least the current count value H of the at least one connection event locally recorded comprises:
    in response to the current count value H being greater than the check count value Q, acquiring a local current time, and determining the occurrence time of the $Q^{th}$ connection event as the local current time minus H−Q connection event intervals.

12. A chip, connected to at least one memory storing instructions executable by the chip, wherein the instructions, when executed by the chip, cause the chip to perform the method for time synchronization according to claim 1.

13. An electronic device comprising the chip according to claim 12.

14. A non-transitory computer readable storage medium storing a computer program, wherein the computer program, when executed by at least one processor, cause the at least one processor to perform the method for time synchronization according to claim 1.

15. The method according to claim 1, wherein connection events are periodically generated after the synchronizing end and the synchronized end are connected, and a count value of connection events at the synchronizing end and a count value of connection events at the synchronized end increase synchronously such that the count value of the connection events at the synchronizing end is the same as the count value of the connection events at the synchronized end at a time of performing time synchronization.

16. The method according to claim 6, wherein the check count value Q is obtained by adding a count value of at least one predicted connection event to the second count value K, and the count value of the at least one predicted connection event is a count value of at least one connection event that possibly occurs when data transmission and data processing occupy time.

17. The method according to claim 1, wherein the check count value Q is less than or equal to the second count value K.

18. The method according to claim 8, wherein the total piece number of the transmitted data of all the network nodes in the broadcast period is equal to a quotient of the broadcast period and the maximum duration for sending data at the single time, the piece number of the transmitted data of each of the network nodes in the broadcast period is equal to a quotient of the total piece number of the transmitted data and the number of the network nodes, and the total duration in which all the network nodes successively complete transmission of one piece of data is equal to a quotient of the broadcast period and the piece number of the transmitted data.

\* \* \* \* \*